(12) United States Patent
Jenko

(10) Patent No.: US 6,428,305 B2
(45) Date of Patent: *Aug. 6, 2002

(54) INJECTION MOLDING NOZZLE TIP INSULATOR AND INJECTION MOLDING DEVICE

(75) Inventor: Edward J. Jenko, Essex Junction, VT (US)

(73) Assignee: Husky Injection Molding Systems Ltd. (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,054

(22) Filed: Oct. 13, 1998

(51) Int. Cl.[7] .................................... B29C 45/20
(52) U.S. Cl. ........................ 425/549; 264/328.15
(58) Field of Search ................ 425/549; 264/328.15

(56) References Cited

U.S. PATENT DOCUMENTS

| | | | |
|---|---|---|---|
| 4,635,851 A | * 1/1987 | Zecman | 425/549 |
| 4,662,837 A | 5/1987 | Anderson | 425/548 |
| 5,208,052 A | 5/1993 | Schmidt et al. | 425/549 |
| 5,299,928 A | 4/1994 | Gellert | 425/190 |
| 5,324,191 A | 6/1994 | Schmidt | 425/549 |
| 5,474,439 A | 12/1995 | McGrevy | 425/549 |
| 5,569,475 A | 10/1996 | Adas et al. | 425/549 |
| 6,022,210 A | * 2/2000 | Gunther | 425/549 |

OTHER PUBLICATIONS

Merriam–Webster's Collegiate Dictionary, p. 442, 1996.*
CRC Handbook of Chemistry and Physics, p. E–16, 1977–78.*
Vespel™ Polyimide Parts and Shapes (visited Sep. 15, 1998) www.dupont.com/enggpolymers/americas/vespel/index.html.

* cited by examiner

Primary Examiner—Tim Heitbrink
(74) Attorney, Agent, or Firm—Katten Muchin Zavis

(57) ABSTRACT

An injection molding nozzle tip insulator includes an inner annular portion in contact with the injection molding nozzle tip, and an outer annular portion in contact with the inner annular portion, the outer annular portion being less thermally conductive than the inner annular portion so that the insulator has a stepped heat gradient profile from an inside to an outside thereof.

20 Claims, 5 Drawing Sheets

INJECTION MOLDING NOZZLE TIP INSULATOR AND INJECTION MOLDING DEVICE

BACKGROUND OF THE INVENTION

1. Field of the Invention

The present invention relates to the field of injection molding. More particularly, the invention relates to insulating nozzle tips used, for example, in thermoplastic molding.

2. Description of the Related Art

Injection molding takes plastic pellets and converts them to a broad array of useful items such as bottles, other types containers, and toys. One example of a device for performing this process has a hopper for holding a quantity of the pellets. A passage links the hopper with a manifold. In the passage, the pellets melt through the action of a screw pushing the pellets along the passage, and heaters warming the passage. The molten plastic reaches the manifold, and is injected through one or more nozzle assemblies into a mold. Each nozzle assembly has an opening for receiving the molten material from the manifold. An elongated portion of the nozzle assembly guides the molten material to its tip. Each nozzle tip has one or more orifices for ejecting the molten material into the mold. A heating assembly in each nozzle assembly maintains the plastic material in a molten state until it is injected into the mold.

The entry orifice in the mold for receiving the molten material, known as a "gate," is sized to accommodate at least a part of the nozzle assembly. Once the molten material reaches the mold, it is rapidly cooled to form the desired shape. To facilitate cooling of the molten material, some molds incorporate channels through which cooling water flows.

In practical application, a number of molds may be arranged in a turret, with the nozzle assembly positioned so that it can be inserted at the gate to the mold. The molten material is then injected into the mold through one or more orifices in the distal end of the nozzle assembly, the nozzle assembly is removed from the mold, and the turret turns a predetermined distance to align the gate of another mold with the nozzle assembly. This process then repeats.

Where the distal end (the tip) of the nozzle assembly nears the mold, the cooler mold may reduce the temperature of the nozzle tip, and hence the temperature of molten material. This causes two problems:

(1) the molten material cools and hardens somewhat, clogging the nozzle orifice(s);

(2) a "gate bubble" develops, formed on molten material leaked because the seal between the nozzle tip and the mold fails.

To avoid these problems, the nozzle tip is frequently insulated. For example, U.S. Pat. No. 5,569,475 to Adas et al. describes a thermal insulator between the nozzle assembly and the surrounding molding plates. This patent describes using, preferably, a ceramic insulator such as zirconia oxide. A thin layer of the zirconia oxide is sprayed onto either the opening in the mold plate, or onto the nozzle body. If a spray-on coating is used, the nozzle body can first be roughened, and an undercoat, such as nickel-aluminum, applied to the nozzle body to assist with bonding. In addition, a protective coating may be sprayed onto the insulator layer. The protective coating, according to the patent, should be a wear-resistant and machinable material, preferably a metal such as titanium, nickel, or molybdenum. This metallic protective layer then contacts the mold.

Other sources also teach insulating a nozzle. For example, U.S. Pat. No. 5,474,439 to McGrevy discloses a cap (a titanium insulator) tightly disposed on the nozzle body by heating. The cap has a gate well, an opening that aligns with the orifice of the nozzle. The cap has projections with indentations therebetween on an outer surface of the cap. The projections abut the mold. The indentations are filled with air, and these air gaps help to maintain the projections abutting the mold at an ambient temperature even when heated fluid flows through the gate wells. This, the patent asserts, maintains the desired relationship between the projections and the mold.

U.S. Pat. No. 5,324,191 to Schmidt discloses a sealed edge gate for an injection molding system. In response to the gate bubble problem above, the Schmidt patent describes placing a seal ring around the tip end of the nozzle housed within a recess in a mold plate. The seal ring, according to a preferred embodiment, is made of a material with a lower thermal coefficient of expansion than that of the nozzle material. For example, the seal ring could be made of titanium, where the nozzle is made of steel or copper alloy. With this arrangement, the expansion of the nozzle will press the seal ring outward against the wall of the mold plate, and will more tightly grip the seal ring. Bubble grooves may be included in the seal ring, the grooves communicating with the nozzle orifices. In this way, plastic material fills the groove and acts as a thermal insulator to minimize the heat transferred via the seal ring to the mold cavity plate.

Another approach, described in U.S. Pat. No. 4,662,837 to Anderson, provides a thermally insulative sleeve for an injection molding apparatus. The sleeve has two components. The first component is elastically yieldable. The second component, located upstream of the first component, is rigid. That is, the two components of the sleeve are arranged serially along a longitudinal direction of the nozzle. The first component may be made of an elastomeric, fluoroplastic, or silicone material which does not degrade at the operating temperature of the nozzle. The second component may be made of liquid crystal aromatic polyester copolymers, polyimides, polyethersulfones. The second component may be termed a back-up ring and provides alignment between the nozzle and the die cavity, while being sufficiently rigid to keep the first component from being displaced.

However, challenges remain in sealing and insulating the interface between the nozzle and the mold. For instance, Vespel™ is useful as an insulator since it is rated to a continuous use temperature of approximately 260° C. [500°]. However, many resins are now processed at higher temperatures which cause polymer degradation and cracking of the known Vespel™ nozzle tip insulator.

Titanium is not an optimum insulator since it conducts too much heat and because it does not always seal properly (e.g., titanium can withstand only a small preload, such as 0.1 mm). If the hot tip positions and/or the gate detail ball dimensions are out of specification, the preload that a titanium insulator can withstand becomes even smaller, and a gap may be created.

With such an imperfect seal, a "gate bubble" may form in which molten material leaks from the orifice(s) of the nozzle. This leaked material then cools and becomes less fluid. Consequently, the material may clog the nozzle orifice(s) and/or seal the gate opening in the mold, interfering with the molding process.

SUMMARY OF THE INVENTION

It is an object of the invention to create a nozzle tip insulator that overcomes the drawbacks of conventional nozzle tip insulators.

To this end, one aspect of the invention comprises a nozzle tip insulator having inner and outer annular portions. The inner annular portion contacts the injection molding nozzle tip, and the outer annular portion contacts the inner annular portion. The outer annular portion is less thermally conductive than the inner annular portion. That is, the insulator has a stepped heat gradient profile from an inside to an outside thereof.

In another aspect, the invention is directed to an injection molding nozzle tip insulator including an inner conductive portion and an outer insulative portion. The outer insulative portion surrounds the inner portion, and an inner surface of the outer portion contacts an outer surface of the inner portion along at least a portion of the surfaces. The inner conductive portion may be, or include, titanium. The outer insulative portion may be, or include, Vespel™.

According to still another aspect, the present invention is directed to a nozzle tip insulator for use with an injection molding nozzle tip. The insulator according to this embodiment includes an inner conductive ring and an outer insulative ring. The outer insulative ring is concentric with the inner ring, with an inner surface of the outer ring contacting an outer surface of the inner ring. The outer insulative ring is less heat-conductive than the inner conductive ring.

Yet another aspect of the invention is an injection molding device including a mold with an opening, and a nozzle assembly for contacting the opening. The nozzle assembly includes a nozzle tip having at least one opening through which molten material passes, and a nozzle tip insulator surrounding the nozzle tip. The nozzle tip insulator, in turn, includes an inner conductive portion, and an outer insulative portion surrounding the inner portion. An inner surface of the outer portion contacting an outer surface of the inner portion along at least a portion of the surfaces.

A further aspect of the present invention encompasses an injection molding nozzle tip insulator including inner means, in contact with a nozzle tip, for conducting heat, and outer means for insulating the heat conducted by the inner means. The outer means surrounding the inner means, an inner surface of the outer means contacting an outer surface of the inner means along at least a portion of the surfaces.

Another aspect of the present invention is directed to a method for insulating an injection molding nozzle tip. The method includes steps of (1) providing an inner annular portion in contact with an injection molding nozzle tip, and (2) providing an outer annular portion in contact with the inner annular portion, the outer annular portion being less thermally conductive than the inner annular portion so that the insulator has a stepped heat gradient profile from an inside to an outside thereof.

An additional aspect of the present invention encompasses a method for insulating an injection molding nozzle tip, including the steps of (1) providing an inner conductive portion of a nozzle tip insulator, and (2) providing an outer insulative portion of a nozzle tip insulator surrounding the inner portion, an inner surface of the outer portion contacting an outer surface of the inner portion along at least a portion of the surfaces.

The invention is described in more detail below with reference to the accompanying drawings.

DESCRIPTION OF THE PREFERRED EMBODIMENTS

Figure 1:
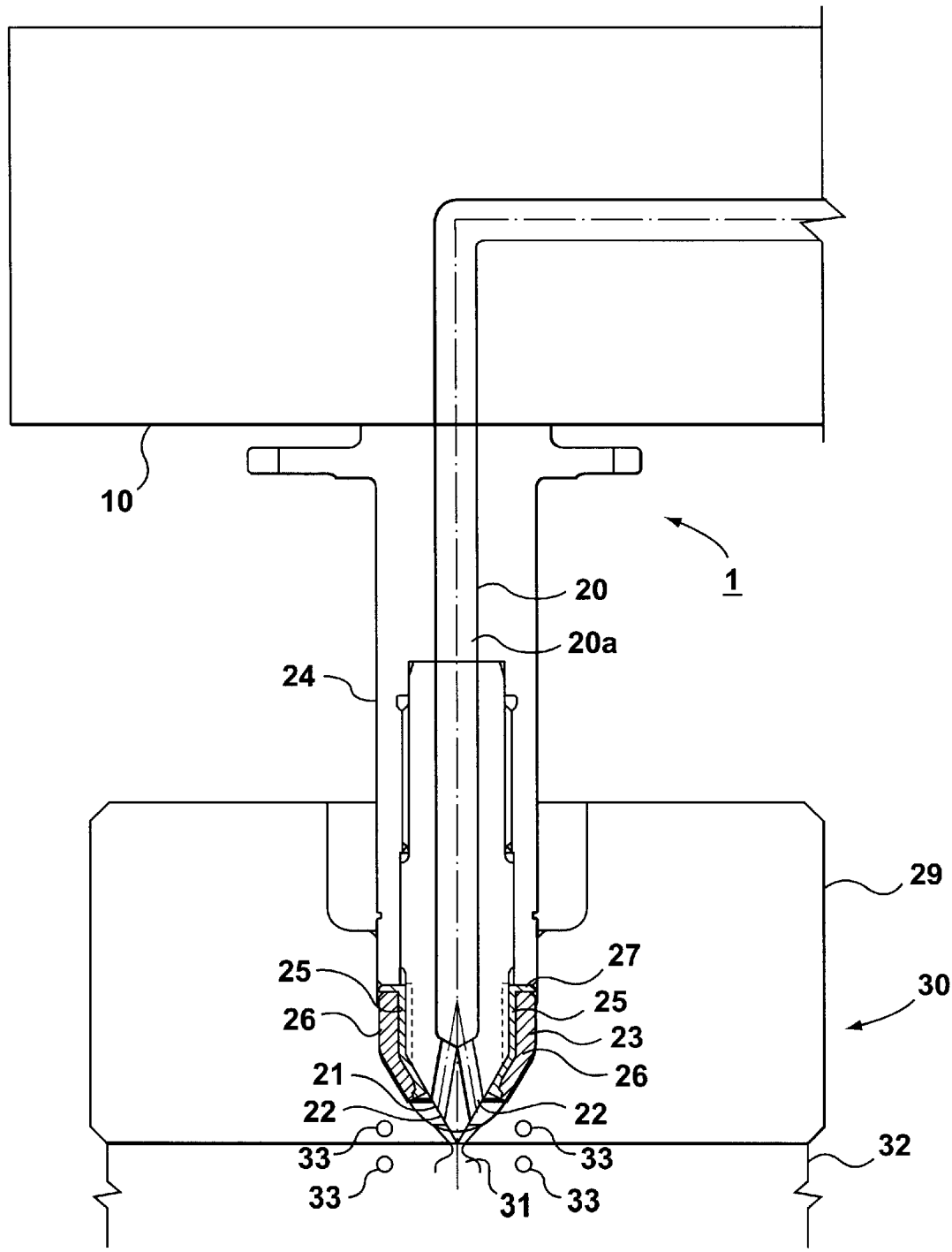
FIG. 1 is a cross-sectional view of a mold and a molding machine including a nozzle tip insulated by a nozzle tip insulator according to the present invention.

The first embodiment of the invention will be described with reference to FIGS. 1 and 2. FIG. 1 illustrates the overall arrangement of molding device 1. The device includes manifold 10 through which molten material reaches nozzle 20. The nozzle has an opening at its proximal end, also called its head portion identified by reference numeral 20a, for receiving the molten material from the manifold. The nozzle feeds the material to nozzle tip 21 at its distal end, having one or more orifices 22. The nozzle injects the molten material through the orifices into mold 30 using known methods. The mold has an upper mold plate 29 and a mold cavity 32. Cooling channels 33 carry cooling water to cool the mold.

Nozzle tip insulator 23 surrounds a portion of nozzle tip 21, and provides thermal insulation for the nozzle tip. Between the nozzle tip insulator and manifold 10, nozzle housing 24 surrounds nozzle 20.

The insulator has a composite design including inner and outer portions. Inner portion 25 surrounds and is in contact with at least a portion of nozzle 20, and outer portion 26 surrounds and is in contact with at least a portion of the inner portion 25 in an axial direction of the nozzle. As shown in FIG. 1, the inner and outer portions are preferably annular, and both portions taper near their distal ends to conform to the shape of the nozzle. The portion of the nozzle tip having the orifice or orifices preferably extends below the distal end of the nozzle tip insulator.

Figure 2:
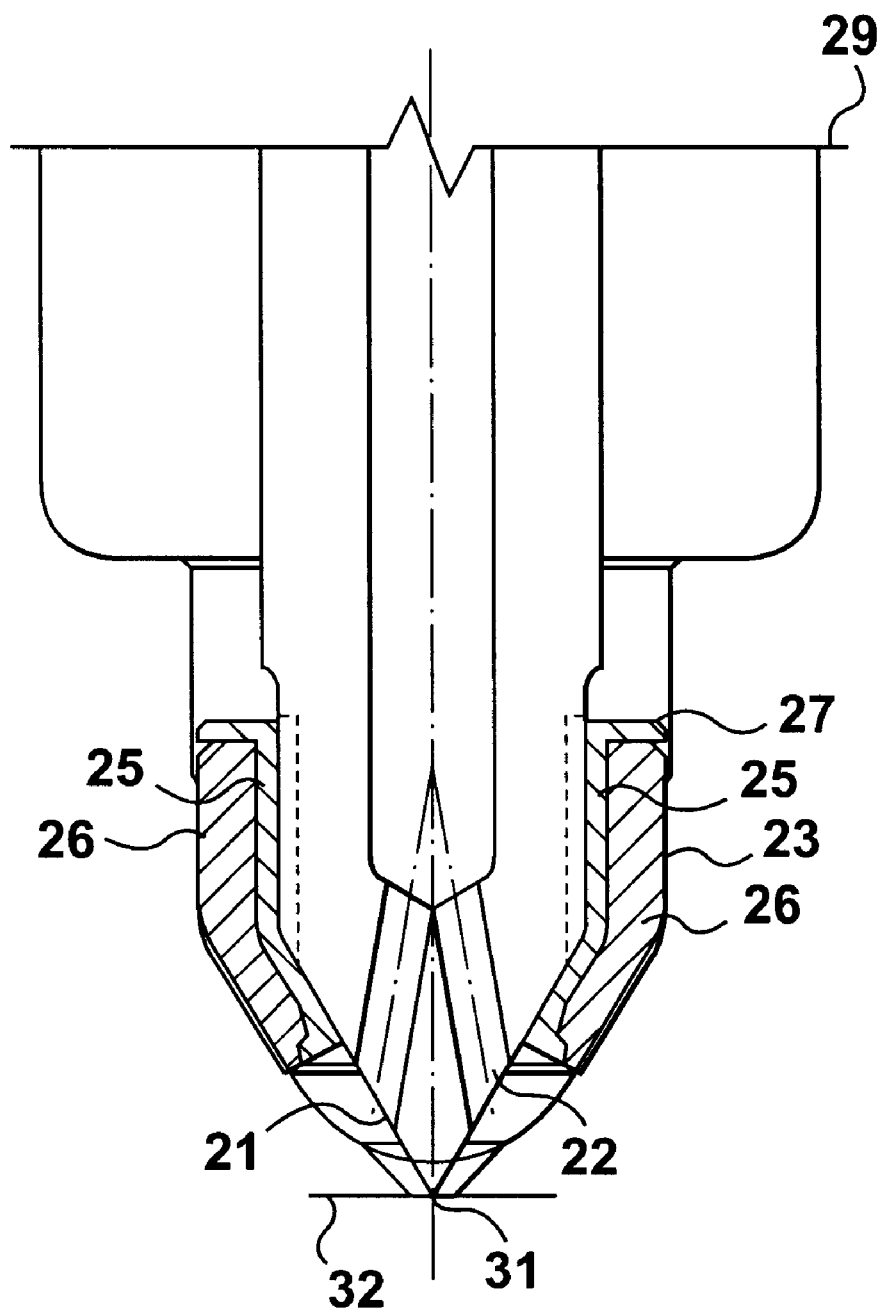
FIG. 2 is a cross-sectional view of a nozzle tip insulator according to a first embodiment of the invention.

In addition, as can be seen in the cross-section shown in FIG. 2, the inner portion 25 preferably has flange portion 27 at a proximal end of the nozzle tip insulator. This flange portion may improve the sealing characteristics of the nozzle tip insulator and provides additional heat transfer characteristics to be described below.

Mold cavity 32 has an opening 31, or "gate," into which the nozzle tip and the insulator may be removably inserted. The molten material passes through the gate into the mold where the material is molded as it cools into the desired form.

FIG. 2 illustrates the first embodiment of the nozzle tip insulator in greater detail. The materials used for the inner and outer portions in the present invention are selected to have different thermal insulation coefficients. In this embodiment, inner portion 25 includes a conductive material, preferably titanium. Outer portion 26 includes an insulative material, preferably Vespel™ polyamide available from DuPont. More information regarding the properties of Vespel™ is available from DuPont.

Figure 3:
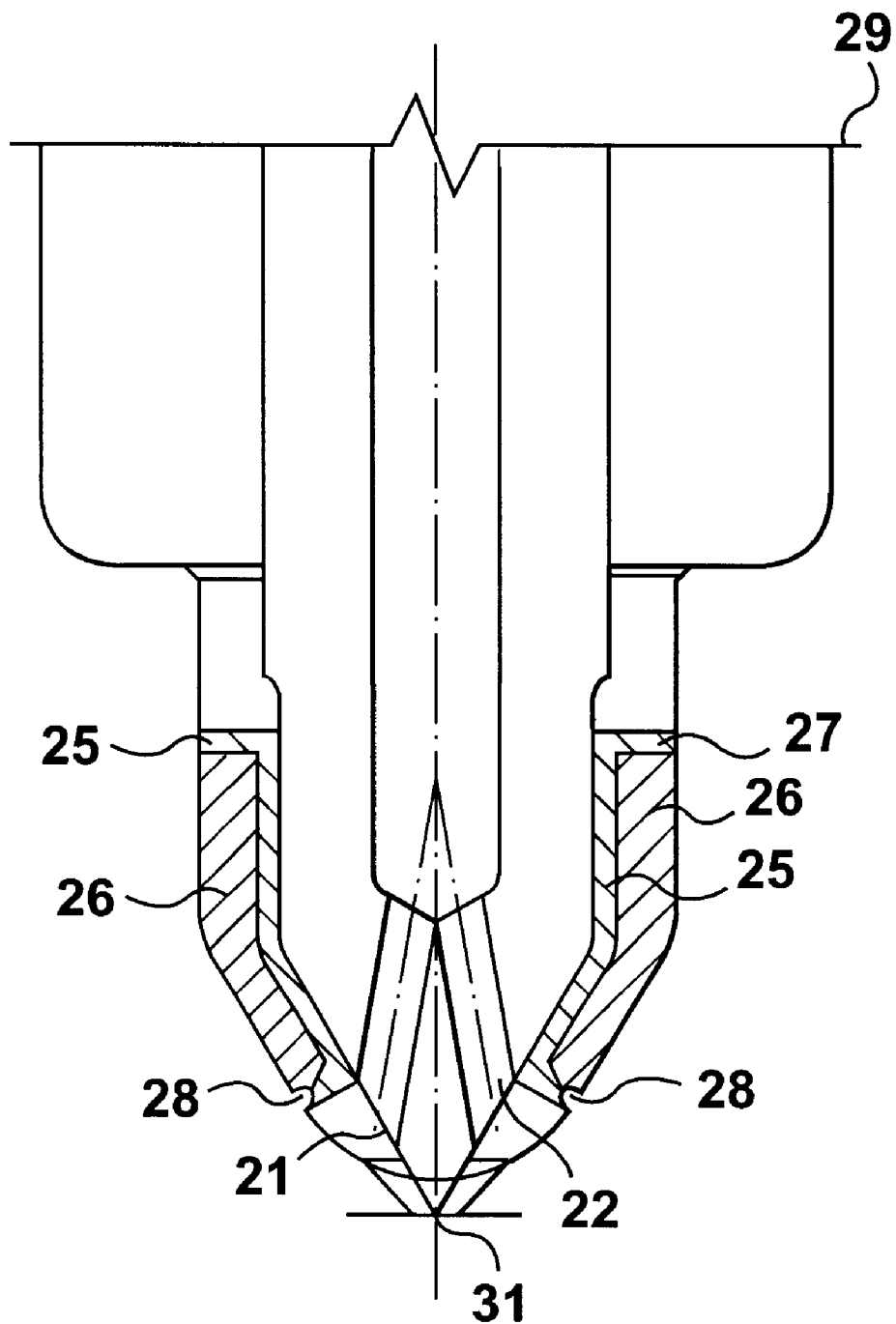
FIG. 3 is a cross-sectional view of a nozzle tip insulator according to a second embodiment of the invention.

As shown in a second embodiment illustrated in FIG. 3, at the distal end of the nozzle tip insulator (the end closest to the nozzle tip) the outer portion may be recessed at ambient temperature, relative to the inner portion, where titanium and Vespel™ are used for the inner and outer portions, respectively. The recess is identified by reference numeral 28 in FIG. 3. This arrangement is advantageous because if the two portions are aligned at ambient conditions, when heated, the outer Vespel™ portion may protrude beyond the titanium face, causing a stagnant zone and exposing an unprotected region of the nozzle tip to pressure from the molten material.

The amount of recess will depend on the materials used for the inner and outer portions, and upon the temperature and pressure conditions to which the nozzle tip insulator will be exposed during the intended molding application. One of ordinary skill in the art would be able to determine the appropriate recess for a particular application.

Figure 4:
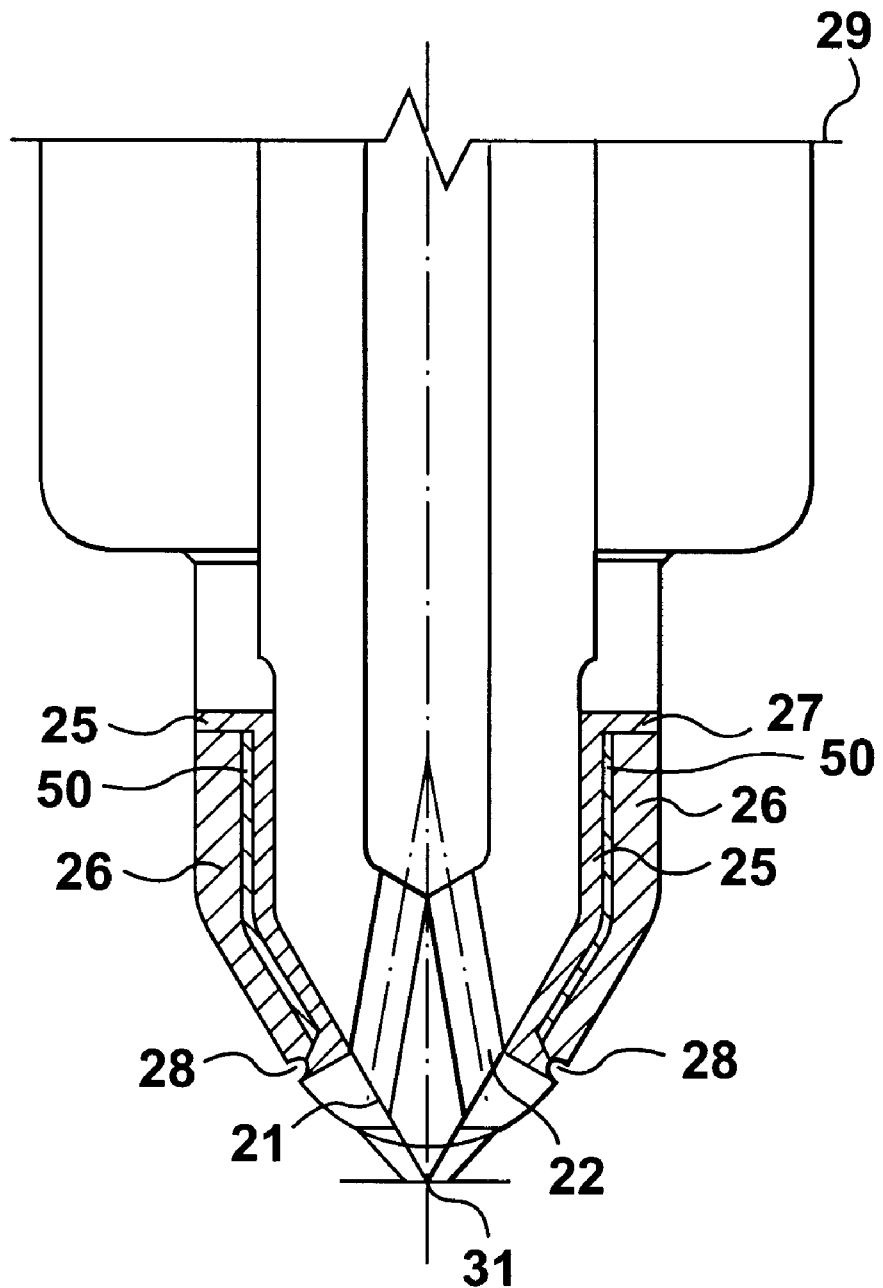
FIG. 4 is a cross-sectional view of a nozzle tip insulator according to a third embodiment of the invention.

FIG. 4 illustrates a third embodiment of the invention having air gaps 50 provided between the tip 21, the inner portion 25 and/or the outer portion 26. The air gaps may be disposed as desired for manufacturing or other reasons.

This composite nozzle tip insulator described in the embodiments above resists deformation, cracking, or other undesirable characteristics, even at high temperatures. This heat resistance results in the nozzle tip insulator being positive sealing, reducing the gate bubble and improving the quality and yield of the molding process. This two-piece construction results in the nozzle tip insulator having a stepped heat gradient profile from an inside to an outside thereof.

This stepped heat gradient extends the useful life of the nozzle tip insulator because the Vespel™ material, when used as an outer portion of the composite tip insulator, experiences a much lower temperature differential compared to a standard design using only Vespel™. Since many resins are now molded at temperatures above Vespel™'s rated continuous use temperature, problems with polymer degradation and cracking in Vespel™ insulators are avoided by the two-part insulators described above.

Figure 5:
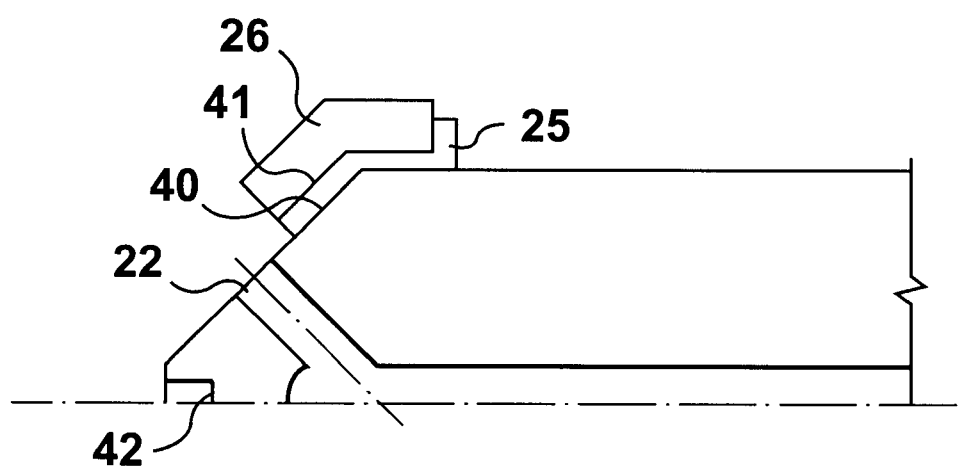
FIG. 5 is a cross-sectional view of a nozzle tip insulator illustrating interfaces at which temperatures were experimentally measured.

Experimental results confirm that the Vespel™ temperature differential is much lower with the composite design tip insulator than it would be with a standard Vespel™ tip insulator. This was confirmed by measuring the temperature of the Ti/tip interface 40 and the temperature of the Ti/Vespel™ interface 41, as well as tip temperature 42, shown in FIG. 5, in nozzle tip insulators of the composite design described herein.

Table 1 displays the average results of three tests.

TABLE 1

Average Results of the Three Tests

| Test (C) | Tip Temp. 42 (C) | Ti/Tip Interface 40 (C) | Vespel ™/Ti Interface 41 (C) |
|---|---|---|---|
| 280 | 253 | 219 | 117 |
| 300 | 271 | 244 | 125 |
| 320 | 288 | 266 | 134 |
| 340 | 305 | 281 | 144 |

Assuming that the Ti/tip interface temperature would be the temperature experienced by a Vespel™ in a standard Vespel™ tip insulator, the temperature differential experienced by the Vespel™ in the composite design nozzle tip insulator was about half that experienced by Vespel™ in a standard Vespel™ tip insulator. This enormous decrease in temperature differential may be explained by thermal contact resistances at each interface.

In practice, the nozzle tip insulator according to the present invention shows an enormous improvement in longevity. One experiment showed an improvement from 6,000 injection cycles before replacement using standard (non-composite) tip insulators to 400,000 injection cycles and counting before replacement using the composite tip insulators of the present invention.

Below are experiments which demonstrate some of the advantages of the present invention.

EXPERIMENT 1

Comparison With Known Nozzle Tip Insulators

The comparison was performed among five insulators each made from one of the following materials:
Celazole
Hyd-Imide HT
Duratron
Vespel™
Composite design: Titanium on the inner (hot) face and Vespel™ on the outer (cold) face.

All five tip insulators were cycled once from room temperature to 260° C. [500° F.] and back down to room temperature and inspected. One of the materials listed above (other than Vespel™) was placed in one test rig and a standard Vespel™ in a parallel test rig. The manifold temperature was set to 405° C. [760° F.] and the tips to 350° C. [665° F.] and maintained for a period of 6 hours. The cooling water temperature in the mold was maintained at 20°.

The Hyd-Imide HT sample failed on the initial heat up and cool down cycle from room temperature to 260° C. [500° F.] and back down to room temperature. The Celazole sample failed on the first 6 hour inspection. Cracking was prevalent on the inside edge (as with the Hyd-Imide HT sample) but also on the conical (seal off) face. The Duratron insulator failed at the first 6 hour inspection. The inner edge which makes contact with the nozzle tip warped (curved) due to the high temperature.

Both the composite design and standard Vespel™ lasted 24 hours (4 tests at 6 hours). These two insulators were then placed back in the rig and left for 20 h before inspection. The inside face of the standard Vespel™ insulator had started to burn, but the composite design was unaffected by the additional testing time. Furthermore, the gate was removed at 100° C. and the tip insulators felt. The standard Vespel™ insulator felt extremely hot on the sealing face, while the composite design was very cool on the sealing face.

EXPERIMENT 2

Longevity of Composite Nozzle Tip Insulator

The test was made with the tip bearing a preload of 0.30 mm. The manifold temperature was set to 410° C. [770° F.] and the tip to 465° C. [870° F.].

The composite design tip insulator withstood the 465° C. [870° F.] temperature for a total of 240 hours (10 days), at which point it appeared that burning and cracking began.

Table 2 summarizes the test results.

TABLE 2

Longevity of Nozzle Tip Insulator Materials

| SAMPLE | LONGEVITY AT TEMPERATURE |
|---|---|
| Standard Vespel ™ | 44 h @ 350° C. [665° F.] |
| Celazole | 6 h @ 350° C. [665° F.] |
| Hyd-Imide HT | failed immediately on heat up cycle |
| Duratron | 6 h @ 350° C. [665° F.] |

TABLE 2-continued

Longevity of Nozzle Tip Insulator Materials

| SAMPLE | LONGEVITY AT TEMPERATURE |
|---|---|
| Composite design (Ti/Vespel ™) | 240 h @ 465° C. [870° F.] |

The composite tip insulator made with an inner titanium portion and an outer Vespel™ portion lasted for 240 hours (10 days) at 465° C. [870° F.]. In actual machine operation, it is unlikely that such an elevated temperature would ever be reached and, hence, the true life of the design will be much longer. Nevertheless, the composite design lasted 5.5 times longer than the tip insulator made of Vespel™ alone at a higher temperature. Assuming that the temperature-time relationship is linear, then the composite design will last 7 times longer than the standard Vespel™. In reality, the temperature-time (longevity) relationship is not linear, and longevity improves faster for a given decrease in temperature. That is, the increase in longevity will be larger than the decrease in temperature. In actual use, the composite design should have a service life of more than 7 times that of the Vespel™ insulator.

EXPERIMENT 3

Actual Molding Process

The composite design of the nozzle tip insulator has also been shown to outperform the Vespel™ design in an injection molding machine when actually making parts.

A test was made with a preload on all four drops of roughly 023 mm, that is, the tip insulators were randomly placed in the drop locations. The injection pressure was increased to 180 MPa [26000 psi] and the tip temperature to 315° C. [600° F.] and good polycarbonate (PC) parts were still produced. These test conditions permitted a quicker comparison between the standard and composite designs, since burning and structural failure would be sped up.

At the 80,000 cycle mark, a comparison of the two designs on six criteria showed the superiority of the composite design. The results are summarized in Table 3 below.

TABLE 3

Comparison of Nozzle Tip Insulators in Actual Molding Operation

| Area of Concern | Standard Vespel ™ | Composite Design |
|---|---|---|
| Leakage on the outside taper face | very insignificant amount had start to proceed backwards along the taper face and the molten resin was starting to burn there | insignificant amount had crept between the Ti and Vespel ™ and leaked out the Ti shoulder but was not burnt and was in a location that could not affect the plastic part as it could not retreat (similar to a weepage channel) |
| Leakage on the inside taper face | significant leakage and burning of the molten resin all along the Id of the insulator. The edge that makes contact with the tip was not sealing | no leakage. Titanium was sealing as designed onto the tip. |
| Burning on the outside taper face | Vespel ™ was not burnt, but plastic was starting to burn | no burning present |
| Burning on the inside taper face | burning of the Vespel ™ had started on the nozzle tip/insulator sealing taper face | some discoloring of the titanium but no burning |
| Presence of cracking | cracking had started on the inside edge that seals with the nozzle tip | no cracking present |
| Bubble characteristics | burning was prevalent in the gate bubble. Streaks in the plastic part would be present shortly. The reason appears to be that the plastic leaked between the insulator and nozzle tip, degrades and then was washing out into the flow path | bubble was clear (PC and no burning was visible anywhere. |

In actual use, then, the composite design tip insulator outperformed the standard Vespel™ insulator for molding polycarbonate at 180 MPa injection pressure and 315° C. tip temperature. The composite design gate bubble was clear with no signs of burning. In contrast, the standard Vespel™ design did not seal on the inside (tip) face, allowing resin to degrade and wash out into the flow path. The standard Vespel™ design gate bubble displayed burned resin. This burned resin would be expected to exit the gate bubble in a few more cycles, leading to streaks and burned parts.

EXPERIMENT 4

Heat Loss Comparison

A comparison of relative thermal heat loss between the standard and composite designs showed a small additional heat loss for the composite design. The size of the additional heat loss, however, was small enough to be unimportant in actual use.

Table 4 displays average results of two sets of tests and the relative heat loss factor:

TABLE 4

Average Tip Temperatures and Heat Loss Factor

| Set Temperature (° C.) | Tip Temperatures (° C.) | | Heat Loss Factor* Composite design to |
|---|---|---|---|
| | Composite design | Standard Vespel ™ design | Standard Vespel ™ design |
| 240 | 189 | 195 | 1.03 |
| 260 | 202 | 209 | 1.03 |
| 280 | 218 | 225 | 1.03 |
| 300 | 232 | 238 | 1.03 |

*calculated as the inverse of the ratio of tip temperatures since the higher tip temperature represents a smaller heat loss.

The individual components shown in outline in this application are all well known in the image recording arts and their specific construction and operation are not critical to the operation or best mode for carrying out the invention.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

I claim:

1. An injection molding nozzle tip insulator comprising:
   an inner annular portion surrounding and in contact with the injection molding nozzle tip; and
   an outer annular portion surrounding and in contact with said inner annular portion, said outer annular portion comprising a solid which is less thermally conductive than said inner annular portion so that said insulator has a stepped heat gradient profile from an inside to an outside thereof, outermost longitudinal ends of said inner annular portion being in direct contact with said outer annular portion.

2. An insulator for an injection molding nozzle tip comprising:
   an inner conductive portion adapted to surround and be in contact with the nozzle tip;
   an outer insulative portion surrounding said inner portion, an inner surface of said outer portion contacting an outer surface of said inner portion along at least a portion of the surfaces, said outer insulative portion comprising a solid and being in direct contact with said inner annular portion throughout an entire length of said inner annular portion.

3. A nozzle tip insulator according to claim 2, said inner conductive portion comprising titanium.

4. An insulator for an injection molding nozzle tip comprising:
   an inner portion adapted to surround and be in contact with the nozzle tip; and
   an outer insulative portion surrounding said inner portion, an inner surface of said outer portion contacting an outer surface of said inner portion along at least a portion of the surfaces, wherein said outer insulative portion comprises polyamide, and wherein a distal end of the outer insulative portion is recessed relative to the inner portion at ambient temperature, such that the outer insulative portion does not protrude beyond the inner portion and cause a stagnant zone when heated.

5. A nozzle tip insulator according to claim 2, said inner conductive portion further comprising a flared portion having an angled surface parallel to an angled surface of said outer insulative portion at a distal end of said nozzle tip insulator, the distal end being an end of said nozzle tip insulator closest to an end of a nozzle tip.

6. A nozzle tip insulator according to claim 2, said inner conductive portion further comprising a flange portion at a proximal end of said nozzle tip insulator, the proximal end being an end of the nozzle tip insulator disposed away from an end of a nozzle tip.

7. A nozzle tip insulator according to claim 2, said inner conductive portion being annular, an opening in said inner conductive portion being sized to accommodate a nozzle tip.

8. A nozzle tip insulator for use with an injection molding nozzle tip having an opening end and a tip end, said insulator comprising:
   an inner conductive ring adapted to contact an outer surface of the nozzle tip;
   an outer insulative ring concentric with said inner conductive ring, an inner surface of said outer insulative ring contacting an outer surface of said inner conductive ring, said outer insulative ring comprising a solid and being less heat-conductive than said inner conductive ring, said inner conductive ring having a flange extending over and contacting at least a portion of an end of said outer insulative ring, a furthest extremity of said inner conductive ring in a longitudinal direction of the tip end being in direct contact with said outer insulative ring.

9. An injection molding device comprising:
   a mold with an opening;
   a nozzle assembly for contacting the opening and comprising:
      a nozzle tip having at least one opening through which molten material passes; and
      a nozzle tip insulator in contact with and surrounding said nozzle tip, said nozzle tip insulator including:
         an inner conductive portion, and
         an outer insulative portion surrounding said inner portion, an inner surface of said outer portion directly contacting an outer surface of said inner portion at outermost longitudinal ends of said inner conductive portion, said outer insulative portion comprising a solid.

10. A molding device according to claim 9, the opening is said mold being sized to accommodate said nozzle assembly to allow molten material to pass from said nozzle assembly into said mold.

11. A molding device according to claim 9, said nozzle assembly further comprising at least one heating element to achieve a temperature within said nozzle assembly so that molten material passes through the opening in said nozzle tip.

12. A molding device according to claim 9, said nozzle tip insulator located on said nozzle tip so that, when said nozzle tip is placed in the opening of said mold, said nozzle tip insulator prevents said nozzle tip from contacting said mold.

13. A molding device according to claim 9, said mold further comprising a cooling element.

14. An injection molding nozzle tip insulator for a nozzle tip having an opening end and a tip end, said insulator comprising:
   inner means, in contact with an outer surface of a nozzle tip, for conducting heat;

outer means for insulating the heat conducted by said inner means, said outer means surrounding said inner means, an inner surface of said outer means contacting an outer surface of said inner means along at least a portion of their respective surfaces, wherein an outermost longitudinal end of said inner means in the direction of the nozzle tip end directly contacts said outer means, said outer means comprising a solid.

15. A nozzle tip insulator according to claim 14, said inner means comprising titanium.

16. An injection molding nozzle tip insulator, comprising:

inner means, in contact with an outer surface of a nozzle tip, for conducting heat;

outer means for insulating the heat conducted by said inner means, said outer means surrounding said inner means, an inner surface of said outer means directly contacting an outer surface of said inner means along an entire outer surface of said inner means, said outer means comprising polyamide.

17. A nozzle tip insulator according to claim 14, said inner means further comprising a flared portion having a surface extending beyond an inner surface of said outer means at a distal end of said nozzle tip insulator, the distal end being an end of the nozzle tip insulator closest to an end of a nozzle tip.

18. A nozzle tip insulator according to claim 14, said inner means further comprising a flange portion extending over an end face of said outer means at a proximal end of said nozzle tip insulator, the proximal end being an end of the nozzle tip insulator disposed away from an end of a nozzle tip.

19. An injection molding nozzle comprising:

a nozzle housing having a head end and a tip end;

a nozzle tip thermal insulator disposed adjacent said nozzle tip end having an inner portion and an outer portion, the inner portion surrounding and in contact with an outer surface of said nozzle housing, said inner portion having a flange in contact with and extending over at least a portion of the distal end of the outer portion, the inner portion and the outer portion each comprising a solid having different thermal insulation coefficients, where the inner portion has a thermal insulation coefficient that is lower than the thermal insulation coefficient of the outer portion.

20. An injection molding nozzle comprising:

a nozzle housing having a head end and a tip end;

a nozzle tip thermal insulator disposed adjacent said nozzle tip end having an inner portion and an outer portion, the inner portion surrounding and in contact with a distal end of said nozzle housing, the inner portion and the outer portion having different thermal insulation coefficients, where the inner portion has a thermal insulation coefficient that is lower than the thermal insulation coefficient of the outer portion, the furthermost end of the inner portion in a longitudinal direction toward the tip end being in direct contact with the outer portion; and an air gap between said inner portion and said outer portion.

* * * * *

UNITED STATES PATENT AND TRADEMARK OFFICE
CERTIFICATE OF CORRECTION

PATENT NO.    : 6,428,305 B2
DATED         : August 6, 2002
INVENTOR(S)   : Edward J. Jenko It is certified that error appears in the above-identified patent and that said Letters Patent is hereby corrected as shown below:

Column 1,
Lines 9 and 10, "other types containers" should read -- other types of containers --.

Column 2,
Line 26, "groove" should read -- grooves --.
Line 47, "500 degrees" should read -- 500 degrees F. --.

Column 3,
Line 33, "contacting" should read -- contacts --.
Line 39, "surrounding" should read -- surrounds --.
Line 40, "contacting" should read -- contacts --.

Column 7,
Line 35, "023 mm" should read -- 0.23 mm --.

Column 9,
Line 20, "the image recording arts" should read -- the molding arts --.
Lines 53 and 54, "inner annular portion" should read -- inner portion --.

Column 10,
Line 48, "the opening is" should read -- the opening in --.

Signed and Sealed this

Thirtieth Day of December, 2003

JAMES E. ROGAN
*Director of the United States Patent and Trademark Office*